(12) United States Patent
Ide et al.

(10) Patent No.: US 6,351,297 B1
(45) Date of Patent: *Feb. 26, 2002

(54) LIQUID CRYSTAL DISPLAY PANEL FOR USING IN A TIMEPIECE COMPRISING REFLECTIVE POLARIZERS AND ABSORPTION FILM

(75) Inventors: Masafumi Ide, Tokorozawa; Takashi Akiyama; Kanetaka Sekiguchi, both of Sayama; Masami Kikuchi, Kodaira; Yuichi Akiba, Tokorozawa; Koji Nakagawa, Hachioji; Takashi Toida, Tokyo, all of (JP)

(73) Assignee: Citizen Watch Co., Ltd., Nishitokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/242,848

(22) PCT Filed: Jun. 30, 1998

(86) PCT No.: PCT/JP98/02931

§ 371 Date: Feb. 25, 1999

§ 102(e) Date: Feb. 25, 1999

(87) PCT Pub. No.: WO99/00696

PCT Pub. Date: Jan. 7, 1999

(30) Foreign Application Priority Data

Jun. 30, 1997 (JP) ............................................... 9-173832

(51) Int. Cl.⁷ ............................................. G02F 1/1335
(52) U.S. Cl. ............................. 349/96; 349/98; 349/61; 349/112; 349/64
(58) Field of Search .............................. 349/96, 97, 98, 349/99, 112, 113

(56) References Cited

U.S. PATENT DOCUMENTS 5,333,072 A * 7/1994 Willett ........................ 359/41
5,684,551 A * 11/1997 Nakamura et al. ............ 349/99

(List continued on next page.)

FOREIGN PATENT DOCUMENTS

EP  0 884 621 A2  12/1998
EP  0 884 622 A2  12/1998

(List continued on next page.)

OTHER PUBLICATIONS

"Derwent Publication Ltd" EP 78 237, pp. 1.

Primary Examiner—William L. Sikes
Assistant Examiner—Tarifur R. Chowdhury
(74) Attorney, Agent, or Firm—Armstrong, Westerman & Hattori, LLP (57) ABSTRACT

A timepiece according to the invention is provided with a liquid crystal display panel capable of displaying at least either of time information or calendar information, and the liquid crystal display panel comprises a liquid crystal cell with liquid crystals sealed thereinbetween, sandwiched between two transparent substrates having an electrode on each of inner surfaces thereof facing each other, polarizing sheets disposed on the external surface of the respective substrates, and a light absorption film disposed on the side of one of the polarizing sheets opposite from the liquid crystal cell. For each of the polarizing sheets, a sheet reflecting the light linearly polarized in the direction orthogonal to the transmission axis thereof is used so that either of a background or a display segment is displayed in a metallic color while the other is displayed in the color of the light absorption film. Thus, the invention provides a timepiece (watch or clock) capable of indicating display that is attractively variable in design.

13 Claims, 5 Drawing Sheets

U.S. PATENT DOCUMENTS

| | | | |
|---|---|---|---|
| 5,686,979 A | * 11/1997 | Weber et al. | 349/96 |
| 5,691,788 A | * 11/1997 | Kim | 349/96 |
| 5,729,313 A | * 3/1998 | Mitsui | 349/106 |
| 5,751,388 A | * 5/1998 | Larson | 349/96 |
| 5,783,120 A | * 7/1998 | Ouderkirk et al. | 264/134 |
| 5,825,542 A | * 10/1998 | Cobb, Jr. et al. | 359/487 |
| 5,841,494 A | * 11/1998 | Hall | 349/98 |
| 5,953,089 A | * 9/1999 | Hiji et al. | 349/112 |
| 5,986,730 A | * 11/1999 | Hansen et al. | 349/96 |
| 5,986,731 A | * 11/1999 | Iijima | 349/117 |
| 6,008,871 A | * 12/1999 | Okumura | 349/61 |
| 6,067,136 A | * 5/2000 | Yamaguchi et al. | 349/96 |
| 6,122,465 A | * 9/2000 | Hiyama et al. | 349/106 |
| 6,124,905 A | * 9/2000 | Iijima | 349/62 |
| 6,141,068 A | * 10/2000 | Iijima | 349/96 |
| 6,271,901 B1 | * 8/2001 | Ide et al. | 349/96 |

FOREIGN PATENT DOCUMENTS

| | | |
|---|---|---|
| EP | 0 890 866 A2 | 1/1999 |
| EP | 0 890 867 A2 | 1/1999 |
| JP | 54-153066 | 12/1979 |
| JP | 56-109389 | 8/1981 |
| JP | 59-55418 | 3/1984 |
| WO | WO95/17691 | 6/1995 |
| WO | WO 95/17692 | 6/1995 |
| WO | WO95/27919 | 10/1995 |
| WO | WO 97/01788 | 1/1997 |

* cited by examiner

LIQUID CRYSTAL DISPLAY PANEL FOR USING IN A TIMEPIECE COMPRISING REFLECTIVE POLARIZERS AND ABSORPTION FILM

BACKGROUND OF THE INVENTION

1. Field of the Invention

The invention relates to a timepiece (watch and clock) for displaying at least either of time information such as an hour, minute, and second, or calendar information such as a date, days of the week, a month, and a year by use of a liquid crystal display panel, and more particularly, to not only a timepiece for indicating digital display of time information and calendar information but also a combination timepiece capable of indicating digital display and analog display of time information by hands, or an analog timepiece for displaying markers and so forth on a dial thereof utilizing a liquid crystal display panel, or for indicating simulated hands for an hour hand, a minute hand, and a second hand.

2. Description of the Related Art

A timepiece for indicating digital display of time information such as the hour, minute, and second, and calendar information such as the date, days of the week, the month, and the year, by use of a liquid crystal display panel, has been in widespread use for wrist watches and clocks, provided with a crystal oscillation circuit.

There has also been in use a combination watch wherein an analog display indicating time information by the hands of the watch is used in combination with digital display indicating time information and calendar information in numbers and letters.

Further, there has been proposed an analog watch for selectively displaying markers in various patterns, or for displaying simulated hands for an hour hand, a minute hand, and a second hand, by providing the dial thereof based on a liquid crystal display panel (refer to, for example, Japanese Patent Laid-open S54-153066).

In a conventional liquid crystal display panel for displaying time information and calendar information, used in such a watch or clock, a liquid crystal cell filled with liquid crystals is sandwiched between two transparent substrates having an electrode on respective inner surfaces thereof, facing each other, and an upper polarizing film and a lower polarizing film are disposed, respectively, on the external surface of the transparent substrates, on the opposite sides. If an electric field is applied to the liquid crystals by applying a voltage to a pair of electrodes on the transparent substrates holding the liquid crystal cell therebetween, the optical property of the liquid crystals is changed, thereby locally controlling transmission and absorption of light falling on the liquid crystal display panel such that a predetermined display is effected.

Either of the upper polarizing film or the lower polarizing film is a polarizing film absorbing the light linearly polarized in a direction orthogonal to the transmission axis thereof.

In the case of a watch using the conventional liquid crystal display panel described above, time information and calendar information are displayed in black against a white background in a normally white mode that is common.

However, by simply displaying time information and calendar information in black against the white background, as described in the foregoing, neither variation in design nor interest can be offered, with a resulting tendency to lose soon popularity with consumers. Probably, as a result, consumption of digital watches has recently been on the decline, and neither combination watches nor analog watches with a liquid crystal display panel have since received market acceptance.

In light of the present situation as described, the invention has been developed, and an object thereof is to provide a timepiece (watch and clock) capable of providing attractive variation in design while indicating digital display or analog display by use of a liquid crystal display panel.

SUMMARY OF THE INVENTION

To this end, the invention provides a timepiece provided with a liquid crystal display panel, capable of displaying at least either of time information or calendar information, and the liquid crystal display panel is made up as follows.

A liquid crystal cell with liquid crystals sealed therein-between is sandwiched between two transparent substrates having an electrode on each of inner surfaces thereof, facing each other, and a light absorption film that is disposed on the side of one of the polarizing sheets opposite from the liquid crystal cell.

For each of the polarizing sheets, a sheet (reflection-type polarizing sheet or polarizing film) reflecting the light linearly polarized in the direction orthogonal to the transmission axis thereof is used.

It is desirable that the polarizing sheets disposed on the opposite sides of the liquid crystal cell be arranged such that the transmission axes of the respective polarizing sheets cross each other at right angles, or run in parallel with each other.

Further, liquid crystals causing linearly polarized light passing therethrough to undergo phase modulation or intensity modulation are sealed in the liquid crystal cell. There are available twisted nematic liquid crystals, ferroelectric or anti-ferroelectri liquid crystals, and so forth as the liquid crystals causing phase modulation to occur, while there are available guest host liquid crystals as the liquid crystals causing intensity modulation to occur. However, twisted nematic liquid crystals having a twist angle of not more than 90 degrees may be used as well.

It is desirable that one of the polarizing sheets, disposed on the visible side of the liquid crystal cell, is arranged such that the transmission axis thereof is aligned in the direction of, or in the direction orthogonal to, the long axes of liquid crystal molecules in the liquid crystal cell, on the visible side thereof.

The timepiece according to the invention, constructed as above, is capable of indicating display in a metallic color by controlling whether all light incoming from the visible side (the upper side) of the liquid crystal cell is reflected, or a half of the light is reflected.

Depending on whether the transmission axes of the polarizing sheets, disposed on the opposite sides of the liquid crystal cell, respectively, cross each other at right angles or run in parallel with each other, whether the transmission axis of one of the polarizing sheets, disposed on the visible side of the liquid crystal cell, is aligned in the direction of or in the direction orthogonal to, the long axes of the liquid crystal molecules in the liquid crystal cell, on the visible side thereof, or depending on the types of liquid crystals in use or the method of applying voltage, either of the background part or display segment can be displayed in a metallic color through full reflection of incoming light while the other can be displayed in the color of the light absorption film.

For example, with the use of a liquid crystal display panel wherein the polarizing sheets disposed above and below the liquid crystal cell, respectively, are arranged such that the transmission axes thereof run in parallel with each other, and the liquid crystal cell with twisted nematic liquid crystals having a twist angle of 90 degrees sealed therein is used, half of the light falling on the liquid crystal cell from the visible side thereof (above) is reflected by the polarizing sheet on the upper side. The other half of the light is transmitted through the liquid crystal cell and, in the background part of the liquid crystal display panel, where no voltage is applied to the liquid crystals of the liquid crystal cell, is rotated by 90 degrees. Consequently, transmitted light is turned into the light linearly polarized in the direction orthogonal to the transmission axis of the polarizing sheet disposed on the lower side, thereby being reflected in full by a polarizing sheet on the lower side. As a result, the background part is displayed in a metallic color (like a mirror).

Meanwhile, in the display segment of the liquid crystal cell for displaying time information and calendar information, where a voltage is applied to the liquid crystals, light transmitted through the liquid crystals is not rotated, and is turned to the light linearly polarized in the direction parallel with the direction of the transmission axis of the polarizing sheet on the lower side, thus being allowed to pass through the polarizing sheet on the lower side to be absorbed by the light absorption film. Consequently, the display segments are displayed in a black color.

If a colored material is used for the light absorption film, light only in a specific color is reflected, and the light reflected is transmitted through the polarizing sheet on the lower side, the liquid crystal cell, and the polarizing sheet on the upper side, in reverse order, falling on the visible side, and indicating display in the color of the light absorption film. In this case, however, since half of the incoming light is reflected by the polarizing sheet on the upper side, the entire surface of the liquid crystal display panel indicates display in a somewhat metallic tone.

Further, it is also possible to display the background part in the color of the light absorption film and to display the display segment in a metallic color by inverting the mode of display as described above.

Accordingly, with the timepiece according to the invention, time information and calendar information can be displayed in a fresh and variable fashion in marked contrast with the conventional timepiece for indicating display of time information and calendar information in a black color against a white background, thereby enabling variation in design to be brought about, and offering a sense of amusement.

Furthermore, with the timepiece according to the invention, wherein a backlight is installed in place of the light absorption film, display by light from the backlight can be effected at night or in dark locations.

If a translucent absorbing film is installed between the backlight and one of the polarizing sheets, adjacent thereto, transmission-type display using light from the backlight as well as reflective-type display using external light can be made easier for a viewer.

Further, if a polarizing film (absorption type) for absorbing the light linearly polarized light in the direction orthogonal to the transmission axis thereof is disposed on the external side of one of the polarizing sheets, disposed on the visible side of the liquid crystal cell of the liquid crystal display panel, so that the transmission axis of the polarizing film is oriented substantially in the same direction as the transmission axis of the polarizing sheet described above, the outgoing quantity of light reflected from across the surface of the polarizing sheet on the upper side is reduced, moderating the metallic gloss (luster) across the surface of the display segment, and enabling a viewer to see the display with greater ease while improving the viewing angle characteristic of the liquid crystal display panel as well.

In this case, by use of a color polarizing film capable of mainly absorbing a light Component at a specific wavelength, out of the light linearly polarized light in the direction orthogonal to the transmission axis thereof as the polarizing film, the metallic gloss (luster) across the surface of the display segment can be moderated without sacrificing much brightness of display.

Otherwise, if a light diffusion layer in place of the polarizing film is installed on the external side of one of the polarizing sheets, disposed on the visible side of the liquid crystal cell of the liquid crystal display panel, light reflected from across the surface of the polarizing sheet on the upper side is diffused, moderating the metallic gloss, and providing a softer display while improving the viewing angle characteristic of the liquid crystal display panel as well.

Furthermore, in the timepiece according to the invention described in the foregoing, in place of the reflective polarizing sheet disposed on the visible side of the liquid crystal cell of the liquid crystal display panel, an absorption-type polarizing sheet may be installed.

BEST MODE FOR CARRYING OUT THE INVENTION

Preferred embodiments of a timepiece according to the invention will be described in detail hereinafter with reference to the attached drawings.

Figure 1:
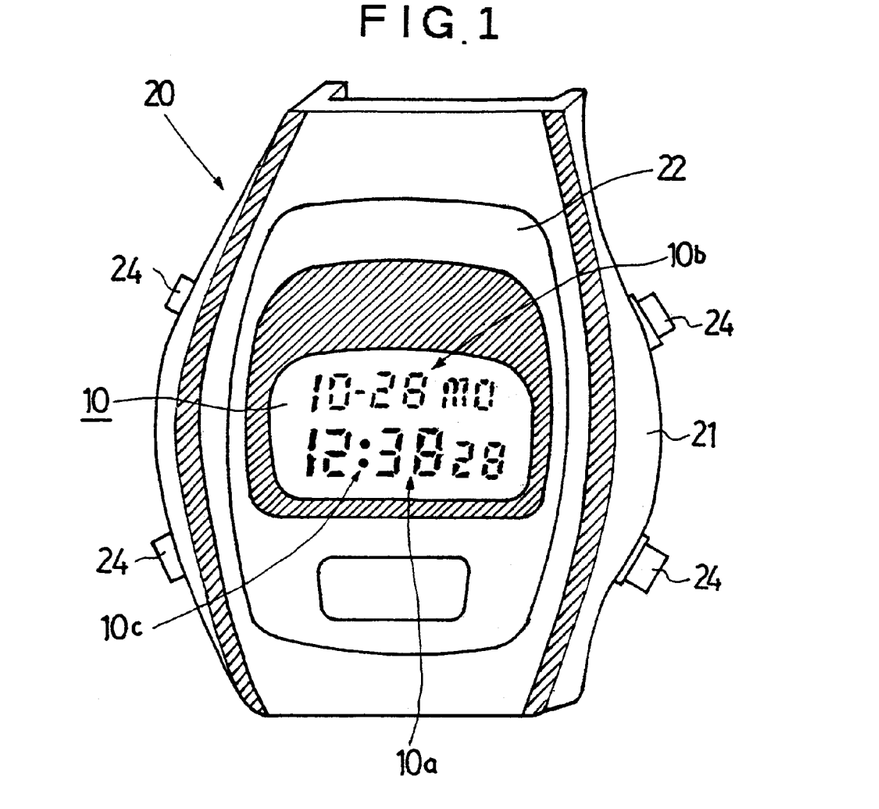
FIG. 1 is a perspective view of an embodiment of a digital quartz watch (timepiece) according to the invention, showing the external view thereof by way of example.
Figure 2:
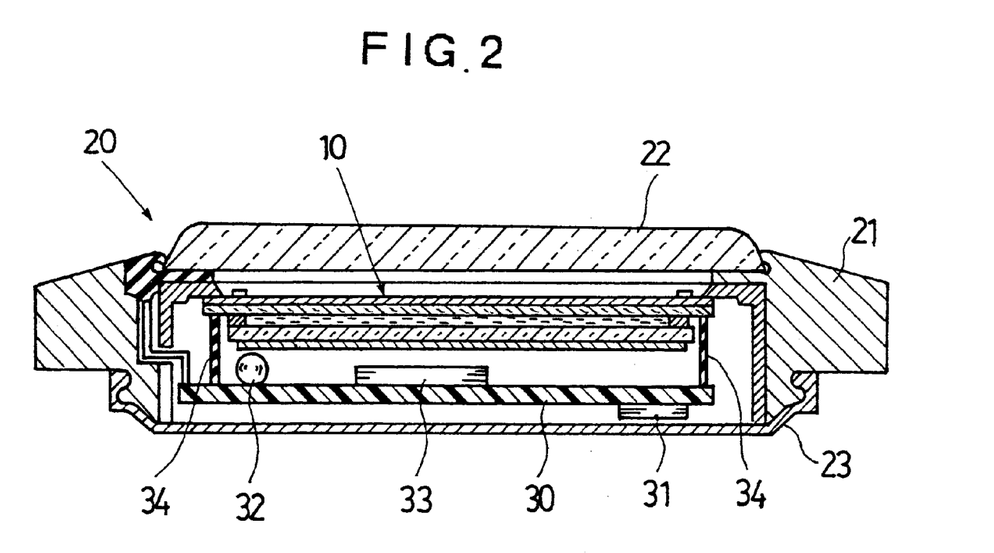
FIG. 2 is a sectional view of the embodiment of the digital quartz watch according to the invention, showing the internal construction thereof.

First, an external view and an internal construction of a digital quartz watch according to the invention are described by way of example with reference to FIGS. 1 and 2.

FIG. 1 is a perspective view of the quartz watch, showing the external view thereof, and FIG. 2 a sectional view of the quartz watch, showing the internal construction thereof.

A case 20 of the quartz watch comprises a glass 22 and a case back 23, integrally joined with a case body 21 made of metal.

The glass 22 is made of a transparent material such as sapphire glass, tempered glass, or plastic, and is integrally joined with the front face of the case body 21 by means of direct bonding, or fitting therein using packing. The case back 23 is integrally joined with the back face of the case body 21 by means of screws or fittings using packing.

Thus, the case 20 has an airtight inner structure so as not to allow ingress of dust or moisture.

A liquid crystal display panel (liquid crystal display device) 10 to serve as a display for indicating time and so forth is installed on the side of the glass 22 inside the case 20.

The liquid crystal display panel 10 comprises a time display section 10a for displaying the hour, minute, and second, a calendar display section 10b for displaying the month, day, days of the week, and a colon mark display section 10c that blinks every second, for example.

Further, the liquid crystal display panel 10 is capable of displaying functions including time display for 12 consecutive hours or 24 consecutive hours as usual, an alarm function, a stopwatch function, a timer function, and so forth.

Changeover among such various functions, and correction of time, is executed by manipulating a plurality of switching buttons 24 installed in the side of the case body 21 of the case 20.

Packing is provided between each of the switching buttons 24 and the case body 21 so as not to allow ingress of dust and moisture into the case 20.

As shown in FIG. 2, the quartz watch has an inner structure such that the liquid crystal display panel 10 and a printed circuit board 30 are disposed substantially parallel with each other inside the case 20, and a battery 31 serving as a driving power source for the printed circuit board 30 is installed on the case back 23 side of the printed circuit board 30.

A semiconductor integrated circuit 33 comprising a crystal oscillator 32 having an oscillation frequency of 32,768 Hz, a crystal oscillation circuit for generating a predetermined signal by oscillating the crystal oscillator, a counting-down circuit, a driving circuit for driving the liquid crystal display panel 10, a central processing unit (CPU) for overall control of the quartz watch, and so forth, is mounted on the printed circuit board 30.

The liquid crystal display panel 10 is electrically connected with the printed circuit board 30 via a zebra-rubber connector 34 disposed therebetween. The zebra-rubber connector 34 is disposed so as to be compressed thicknesswise in order to ensure electrical connection between the liquid crystal display panel 10 and the printed circuit board 30.

The zebra-rubber connector 34 is made up of electrically conductive layers, composed of insulating silicone rubber with carbon and metal particles contained therein, and formed at a predetermined pitch, and electrically conductive in the direction of thickness thereof via the respective electrically conductive layers, but is in a transversely insulated condition between adjacent electrically conductive layers.

A connection terminal pattern is formed on the faces of the liquid crystal display panel 10 and the printed circuit board 30, opposite to each other, respectively, in such a fashion as to correspond to vertically conductive parts of the zebra-rubber connector 34, formed of the electrically conductive layer, respectively, and insulation parts of the zebra-rubber connector 34, alternately disposed, and in dimensions at the same pitch as that for the vertically conductive parts.

The construction of the liquid crystal display panel 10 is described hereinafter in detail with reference to FIGS. 3 and 4.

Figure 3:
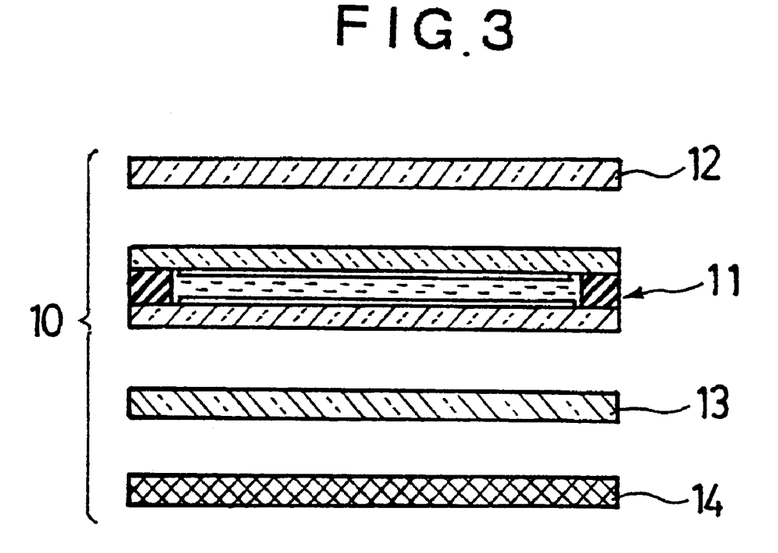
FIG. 3 is a schematic sectional view of a liquid crystal display panel used in the embodiments of the digital quartz watch according to the invention, for illustrating the construction thereof by way of example.

FIG. 3 is a schematic sectional view for illustrating the construction of the liquid crystal display panel 10 by way of example, showing an enlarged view of spacing between respective layers.

As shown in FIG. 3, the liquid crystal display panel 10 is made up of a liquid crystal cell 11, a first polarizing sheet 12 disposed on the upper surface side of the liquid crystal cell 11, a second polarizing sheet 13 disposed on the underside surface side of the liquid crystal cell 11, and a light absorption film 14 disposed under the second. polarizing sheet 13.

Figure 4:
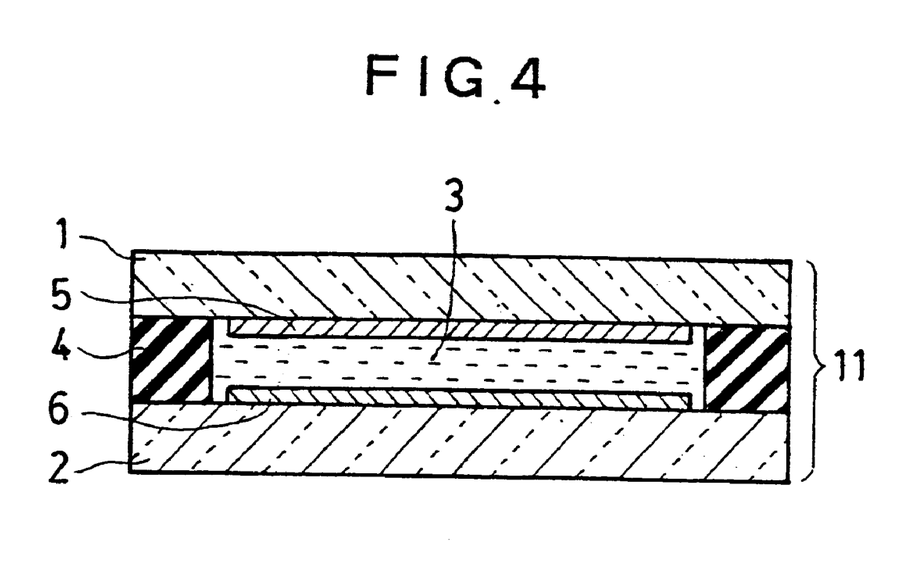
FIG. 4 is an enlarged sectional view of a liquid crystal cell of the liquid crystal display panel, showing the construction thereof; and, FIGS. 5 to 10 are schematic sectional views, similar to FIG. 3, for illustrating various other examples of the construction of a liquid crystal display panel used, respectively, in carrying out the embodiments of the digital quartz watch according to the invention.

As shown in FIG. 4, the liquid crystal cell 11 comprises two glass substrates 1, 2, and liquid crystals 3 sandwiched between the two glass substrates so as to be sealed in with sealing agents 4, and a twisted nematic (TN) liquid crystal compound having a twist angle of not more than 90 degrees is used for the liquid crystals 3.

Transparent electrodes 5, 6, made of indium tin oxide (ITO), are formed on the inner faces of the two glass substrates 1, and 2, respectively, on the side in contact with the liquid crystals 3, and an aligning treatment is further applied to the inner face of the respective transparent electrodes, in contact with the liquid crystals 3, such that liquid crystal molecules are aligned in a predetermined direction.

The alignment condition of the liquid crystals 3 held between the transparent electrodes 5, 6 is altered by applying a voltage therebetween, thereby displaying time information and calendar information.

The first polarizing sheet 12 and the second polarizing sheet 13, disposed above and below the liquid crystals 3, respectively, with the liquid crystals 3 interposed therebetween, are arranged so that the transmission axes thereof are parallel with each other.

Either of the first polarizing sheet 12 or the second polarizing sheet 13 is a polarizing sheet (reflective-type polarizing sheet) reflecting the light linearly polarized light in the direction orthogonal to the transmission axis thereof. For example, an optical film, DBEF (trade name), manufactured by Sumitomo 3M Co., Ltd., is used for the first polarizing sheet 12 and the second polarizing sheet 13.

Such a reflective-type polarizing element as described has been developed by Minnesota Mining and Manufacturing Co., U.S.A., and is described in detail in JP (PCT) H9-507308A (International Publication No. WO95/17691) and JP (PCT) H9-511844A (International Publication No. WO95/27919).

With the quartz watch according to this embodiment of the invention, half of the light falling on the liquid crystal display panel 10 from above (as in FIG. 3) is reflected by the first polarizing sheet 12, and the other half thereof is transmitted therethrough. In the background part of the liquid crystal display panel 10, for displaying time information and calendar information, the transmitted half of the light is rotated by 90 degrees when transmitted through the liquid crystal cell 11 since no voltage is applied to the liquid crystals 3 of the liquid crystal cell 11 and is turned to the light linearly polarized in the direction orthogonal to the transmission axis of the second polarizing sheet 13, thus being reflected by the second polarizing sheet 13.

Consequently, substantially all the light falling on the background part for displaying information is reflected, indicating display in a metallic color (like a mirror).

In a display segment of the liquid crystal cell 11 for indicating digital display of time information and calendar information, where a voltage has been applied, light transmitted through the first polarizing sheet 12 is not rotated when transmitted through the liquid crystal cell 11, and is turned to the light linearly polarized light in the direction parallel with the direction of the transmission axis of the second polarizing sheet 13, thereby being allowed to pass through the second polarizing sheet 13, to be absorbed by the light absorption film 14. Consequently, display is indicated in a dark color.

By use of a material colored so as to reflect a specific light component (wavelength) only as the light absorption film 14, digital display of time information and calendar information can be executed in optional colors.

Thus, the timepiece according to the invention is capable of indicating digital display in an optional color against the background in a metallic tone in marked contrast with the conventional digital timepiece for displaying time information and calendar information in a black color against a white background, offering variation in design and enhancing the user's sense of amusement.

Further, if the first polarizing sheet 12 and the second polarizing sheet 13, disposed above and below the liquid crystal cell 11, respectively, holding the liquid crystal cell 11 thereinbetween, are arranged such that the transmission axes of both the first and second polarizing films cross each other at right angles so as to conform to the twist angel of the liquid crystals 3, brightness and darkness can be inverted between the background part and the display segment, thereby enabling digital display to be indicated in a metallic color.

Furthermore, it is also possible to render transparent the display segment or the background part through which half of the light falling on the liquid crystal display panel 10 is transmitted by dispensing with the light absorption film 14 shown in FIG. 3 so that the internal structure of the timepiece such as the printed circuit board 30 and so forth shown in FIG. 2 can be seen from the outside.

Also, for the liquid crystal display panel, a liquid crystal display panel of the dot matrix display mode may be adopted, or a liquid crystal display panel, wherein patterns for a multitude of hands inclined at various angles, slightly shifted from each other, are formed, may be adopted, making up an analog watch or clock capable of indicating graphic display of simulated hands for an hour hand, a minute hand, and a second hand.

Needless to say, it is also possible to effect digital display of calendar information only while indicating analog display of time information by simulated hands, or to indicate display of time information only with display for other functions such as alarm, stopwatch, and so forth, added thereto.

The case wherein the liquid crystals that are sealed in the liquid crystal cell 11 are composed of the twisted nematic (TN) liquid crystal compound has been described in the foregoing by way of example. However, supertwisted nematic (STN) liquid crystal compound or cholesteric liquid crystal compound may be used instead.

Now, other embodiments of a liquid crystal display panel, used in the timepiece according to the invention, are described hereinafter with reference to FIGS. 5 to 10.

Any of these figures is a schematic sectional view similar to FIG. 3, for illustrating various constructions of the liquid crystal display panel by way of example, used in carrying out the invention. Parts corresponding to those previously described with reference to FIG. 3 are denoted by the same reference numerals, and description thereof is omitted.

With the liquid crystal display panel shown in FIG. 5, a first polarizing sheet 12 and a second polarizing sheet 13, which are both reflective-type polarizing sheets, are disposed above and below a liquid crystal cell 11, respectively, with the liquid crystal cell 11 interposed therebetween, as with the case of the liquid crystal display panel 10 shown in FIG. 3, except that a backlight 15 is installed in place of the light absorption film 14 under the second polarizing sheet 13.

For the backlight 15, an electroluminescence (EL) element, a light-emitting diode (LED) element, a cold cathode tube, or a hot cathode tube is used.

The liquid crystal display panel according to this embodiment has the same display function, using external light, as that for the liquid crystal display panel 10 described in the foregoing. However, the light transmitting part thereof indicates display in the color of the surface of the backlight 15 instead of the color of the light absorption film 14.

By causing the backlight 15 to emit light when the external light is insufficient in quantity, the light emitted thereby propagates toward the visible side (upward in FIG. 5) through a light transmitting part so that either of a display segment or a background part is illuminated for display by the light emitted by the backlight 15.

Accordingly, display in various colors can be effected by use of substances emitting light in various colors such as red, green, yellow, and so forth, for the backlight 15, or by use of a substance emitting white light in combination with color filters.

With the use of the liquid crystal display panel described above, it is possible to provide a timepiece having various modes of display as with the case of the foregoing embodiment.

Figure 5:
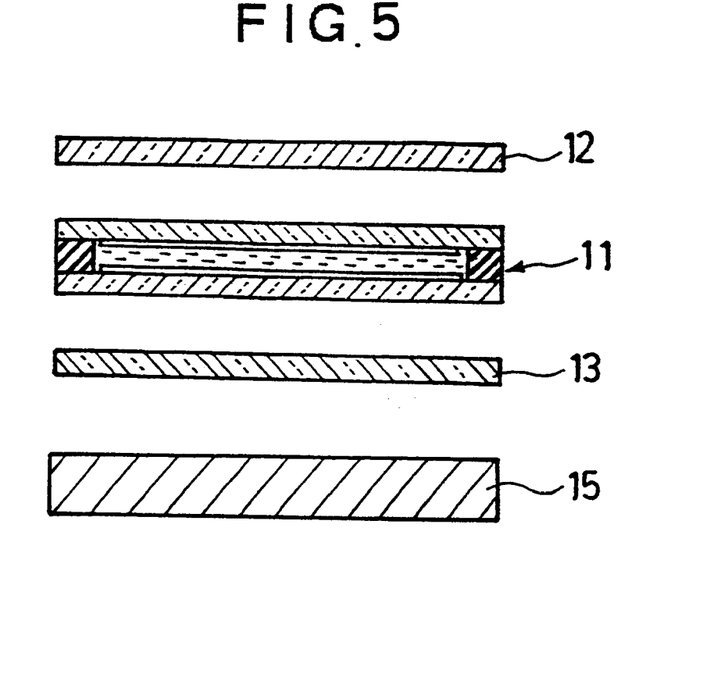
Figure 6:
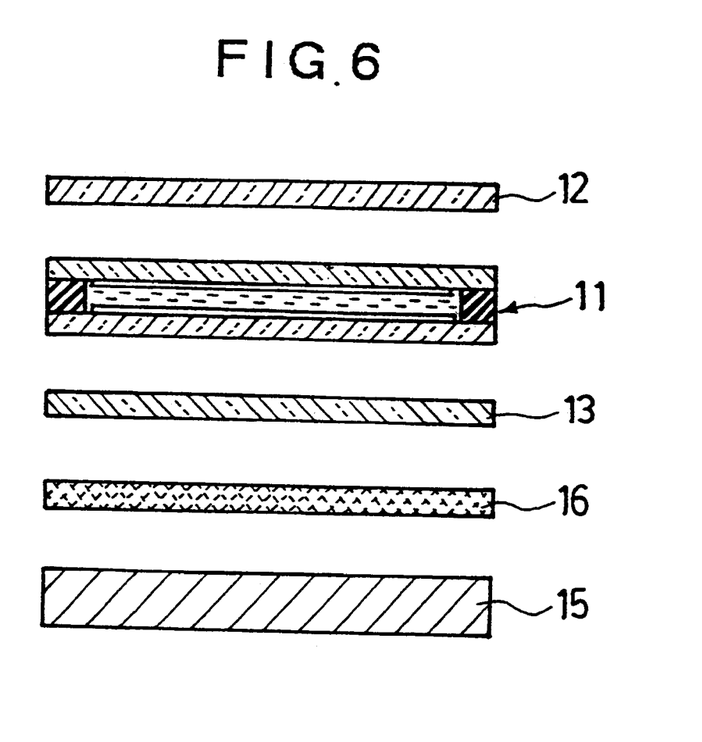

The liquid crystal display panel shown in FIG. 6 is provided with a translucent absorbing film 16 disposed between the backlight 15 of the liquid crystal display panel shown in FIG. 5, and the second polarizing sheet 13 adjacent thereto.

With such a construction, in the case of reflective-type display using external light, a viewer can see the display in the color of the translucent absorbing film 16 with greater ease. Also, in the case of transmission-type display using backlight, light emitted by the backlight 15 is moderated when transmitted through the translucent absorbing film 16, thereby effecting display in a softer tone easier for a viewer to see.

Figure 7:
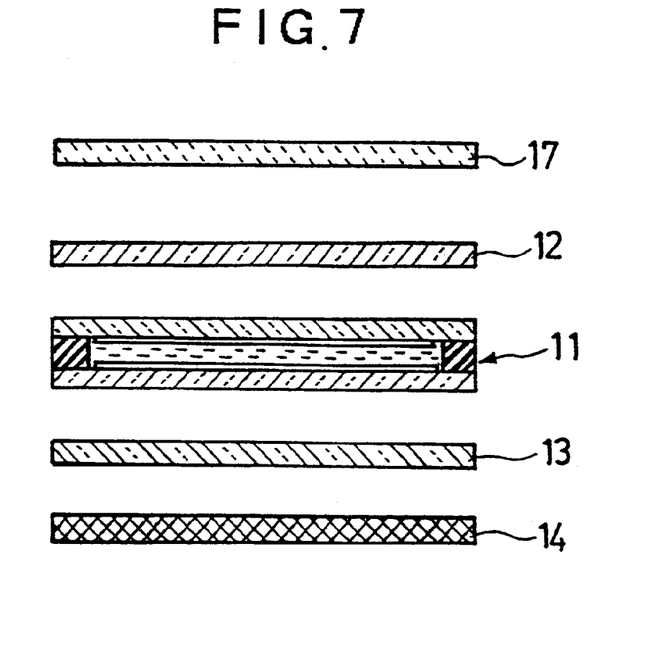

The liquid crystal display panel shown in FIG. 7 is provided with a polarizing film 17 disposed on the upper side of the first polarizing sheet 12 of the liquid crystal display panel 10 shown in FIG. 3.

The polarizing film 17 is a common absorption-type polarizing film for absorbing the light linearly polarized light in the direction orthogonal to the transmission axis thereof, and disposed such that the transmission axis thereof is oriented substantially in the same direction of the transmission axis of the first polarizing sheet 12.

With this liquid crystal display panel 10, although half of the external light falling thereon is absorbed by the polarizing film 17, the other half thereof falling on the first polarizing sheet 12, in the form of the light linearly polarized light in the same direction as that of the transmission axis of the first polarizing sheet 12, is transmitted through the first polarizing sheet 12, and then falls on the liquid crystal cell 11.

The liquid crystal display panel 10 according to this embodiment has the same functions and effects as those of the liquid crystal display panel 10 shown in FIG. 3.

A potion of the incoming light, rotated through 90 degrees in the liquid crystal cell 11, is reflected by a second polarizing sheet 13, indicating display in a metallic color while the other portion of the incoming light, not rotated in the liquid crystal cell 11, is absorbed by a light absorption film 14, indicating display in the color of the light absorption film 14.

In this case, as little light is reflected from across the surface of the first polarizing sheet 12, a somewhat darker display will be shown. However, metallic gloss (luster) across the surface of the display will be moderated, enabling a viewer to see the display with greater ease and improving the viewing angle characteristic of the liquid crystal display panel.

As the polarizing film 17, a color polarizing film capable of mainly absorbing light at a specific wavelength, out of the light linearly polarized in the direction orthogonal to the transmission axis thereof, may preferably be used. This will enable metallic gloss (luster) across the surface of the display to be moderated without sacrificing much brightness of display, and further will enable a viewer to see the display with greater ease, thereby improving the viewing angle characteristic of the liquid crystal display panel as well.

Further, in place of the light absorption film 14, a backlight 15, the same as for the liquid crystal display panel 10 shown in FIG. 5, may be installed, or a translucent absorbing film 16 and the backlight 15 may be installed as with the case of the liquid crystal display panel shown in FIG. 6. Otherwise, all those layers described in the foregoing may be dispensed with so that the internal structure of the timepiece can be seen from outside through the transparent part.

Figure 8:
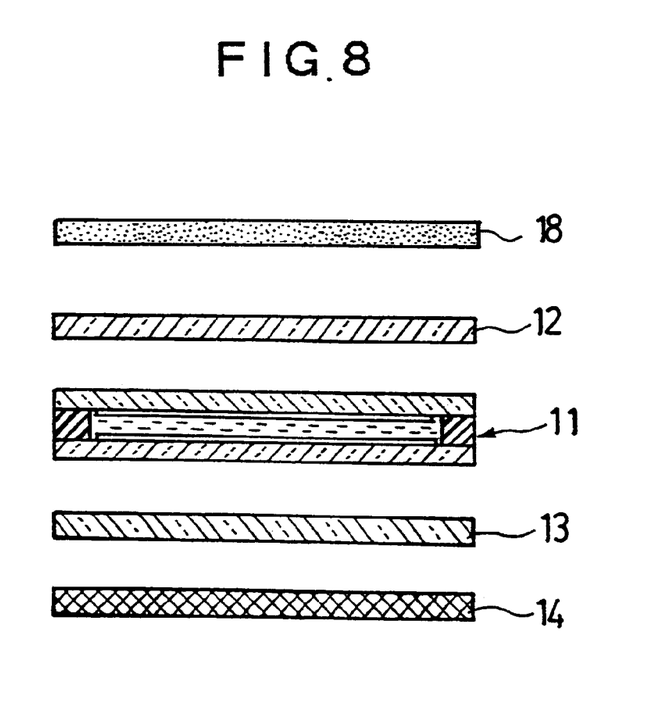

The liquid crystal display panel shown in FIG. 8 is provided with a light diffusion sheet 18 serving as a light diffusion layer on the upper side of the first polarizing sheet 12 of the liquid crystal display panel 10 shown in FIG. 3.

For the light diffusion sheet 18, a transparent base film with embossing applied to the surface thereof, or a base film with light dispersion particles diffused therein may be used. Otherwise, instead of installing the light diffusion sheet 18 separately, the upper surface of the first polarizing sheet 12 may be coated with a light diffusion layer, or bonded to a light diffusion film.

With such a construction as described above, since light reflected from across the surface of the first polarizing sheet 12 is diffused, metallic gloss can be moderated, effecting display in a softer tone and improving the viewing angle characteristic of the liquid crystal display panel as well. However, contrast between brightness and darkness in display will be somewhat deteriorated in this case.

With this liquid crystal display panel as well, in place of a light absorption film 14, a backlight 15, the same as for the liquid crystal display panel 10 shown in FIG. 5, may be installed, or a translucent absorbing film 16 and the backlight 15 may be installed as with the case of the liquid crystal display panel shown in FIG. 6. Otherwise, all those layers described in the foregoing may be dispensed with so that the internal structure of the timepiece can be seen from outside through the transparent part.

Figure 9:
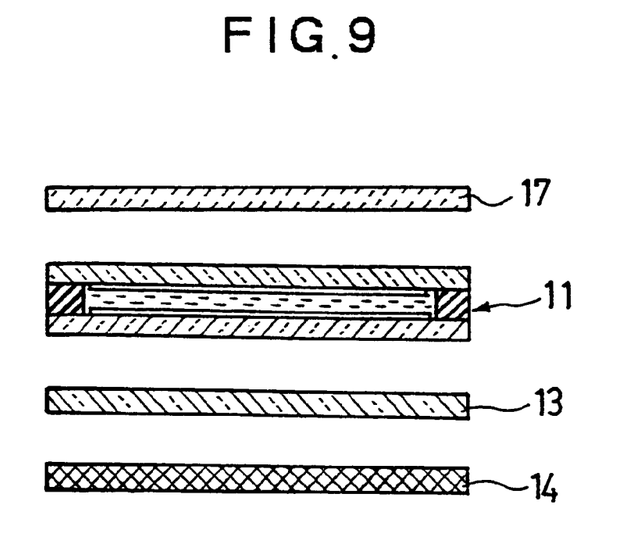

The liquid crystal display panel shown in FIG. 9 is provided with a polarizing film 17 of the absorption type, the same as the polarizing film 17 of the embodiment shown in FIG. 7, in place of the first polarizing sheet 12 of the liquid crystal display panel 10 shown in FIG. 3.

It is desirable to dispose the polarizing film 17 such that the transmission axis thereof runs parallel with, or crosses at right angles with, the transmission axis of the second polarizing sheet 13.

Such a liquid crystal display panel as described above, too, has display functions equivalent to those of the liquid crystal display panel 10 shown in FIG. 7.

Figure 10:
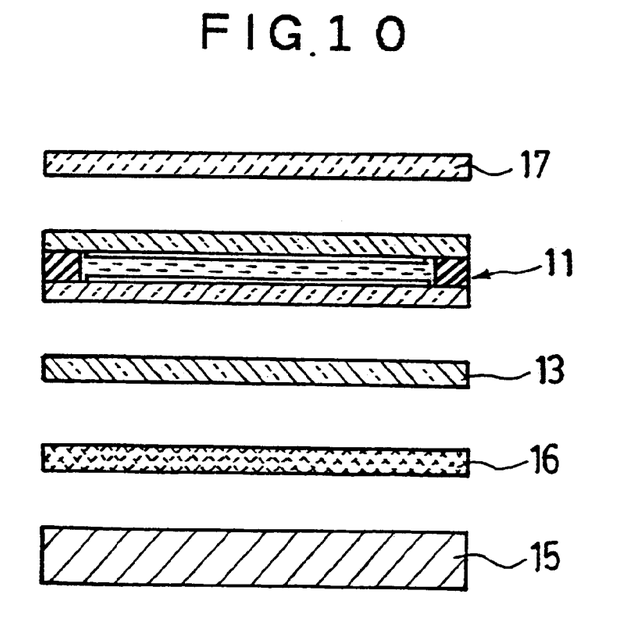

With the liquid crystal display panel shown in FIG. 10, in place of the light absorption film 14 of the liquid crystal display panel shown in FIG. 9, a translucent absorbing film 16 and a backlight 15 are installed, and consequently, this liquid crystal display panel is provided with combination of the display functions of the liquid crystal display panels shown in FIGS. 6 and 9, respectively.

In the case of the liquid crystal display panel shown in FIG. 10, the translucent absorbing film 16 may be dispensed with, or both the translucent absorbing film 16 and the backlight 15 may be dispensed with so that the internal structure of the timepiece can be seen from outside through the transparent part.

INDUSTRIAL APPLICABILITY

The invention can provide a timepiece capable of indicating colorful and amusing digital display, analog display, or combination of both because a liquid crystal display panel used therein can display time information and calendar information in a metallic color, and a black color, or various colors of a light absorption film 14 or the color of light emitted by a backlight, and so forth, enabling variation in the design of wrist watches and clocks to be developed.

What is claimed is:

1. A timepiece comprising a liquid crystal display panel capable of displaying at least either of time information or calender information, said liquid crystal display panel comprising:

a liquid crystal cell with liquid crystals sealed therebetween, sandwiched between two transparent substrates having an electrode on each of inner surfaces thereof facing each other;

polarizing sheets disposed on an external surface of the transparent substrates of the liquid crystal cell, respectively; and a light absorption film disposed on the side of only one of the polarizing sheets, opposite from the liquid crystal cell, wherein each of said polarizing sheets is a sheet reflecting the light linearly polarized in a direction orthogonal to the transmission axis thereof.

2. A timepiece according to claim 1, wherein the polarizing sheets disposed on the opposite sides of the liquid crystal cell, respectively, are arranged such that the transmission axes of the respective polarizing sheets cross each other at right angles.

3. A timepiece according to claim 1, wherein the polarizing sheets disposed on the opposite sides of the liquid crystal cell, respectively, are arranged such that the transmission axes of the respective polarizing sheets are aligned parallel with each other.

4. A timepiece according to claim 1, wherein liquid crystals causing linearly polarized light passing therethrough to undergo phase modulation or intensity modulation are sealed in the liquid crystal cell.

5. A timepiece according to claim 4, wherein the liquid crystals are twisted nematic liquid crystals.

6. A timepiece according to claim 1, wherein one of the polarizing sheets, disposed on a visible side of the liquid crystal cell, is arranged such that the transmission axis thereof is aligned in the direction of, or in the direction orthogonal to, long axes of liquid crystal molecules present on the visible side of the liquid crystal cell.

7. A timepiece according to claim 1, wherein the liquid crystal display panel is provided with a polarizing film installed on the external side of the polarizing sheet disposed on the visible side of the liquid crystal cell, for absorbing the light linearly polarized in the direction orthogonal to the transmission axis thereof, and     wherein the transmission axis of said polarizing film is oriented substantially in the same direction as the transmission axis of the polarizing sheet disposed on the visible side of the liquid crystal cell.

8. A timepiece according to claim 7, wherein the polarizing film is a color polarizing film capable of mainly absorbing a light component at a specific wavelength, out of the light linearly polarized in the direction orthogonal to the transmission axis thereof.

9. A timepiece according to claim 1, wherein the liquid crystal display panel is provided with a light diffusion layer installed on the external side of the polarizing sheet disposed on the visible side of the liquid crystal cell.

10. A timepiece comprising a liquid crystal display panel capable of displaying at least either of time information or calendar information, said liquid crystal display panel comprising:

a liquid crystal cell with liquid crystals sealed thereinbetween, sandwiched between two transparent substrates having an electrode on each of inner surfaces thereof facing each other;

polarizing sheets disposed on an external surface of the transparent substrates of the liquid crystal cell, respectively; and     a backlight disposed on a side of only one of the polarizing sheets, opposite from the liquid crystal cell, wherein each of said polarizing sheets is a sheet reflecting the light linearly polarized in a direction orthogonal to the transmission axis thereof,     wherein a translucent absorbing film is installed between the backlight and the polarizing sheet adjacent thereto.

11. A timepiece according to claim 10, wherein the liquid crystal display panel is provided with a polarizing film disposed on the external side of the polarizing sheet disposed on the visible side of the liquid crystal cell, for absorbing the light linearly polarized in the direction orthogonal to the transmission axis thereof, and     wherein the transmission axis of said polarizing film is oriented substantially in the same direction as the transmission axis of the polarizing sheet disposed on the visible side of the liquid crystal cell.

12. A timepiece according to claim 11, wherein the polarizing film is a color polarizing film capable of mainly absorbing a light component at a specific wavelength, out of the light linearly polarized in the direction orthogonal to the transmission axis thereof.

13. A timepiece according to claim 10, wherein the liquid crystal display panel is provided with a light diffusion layer installed on the external side of the polarizing sheet disposed on the visible side of the liquid crystal cell.

* * * * *